(No Model.)
D. PHILLIPS.
SAW.
No. 560,426. Patented May 19, 1896.
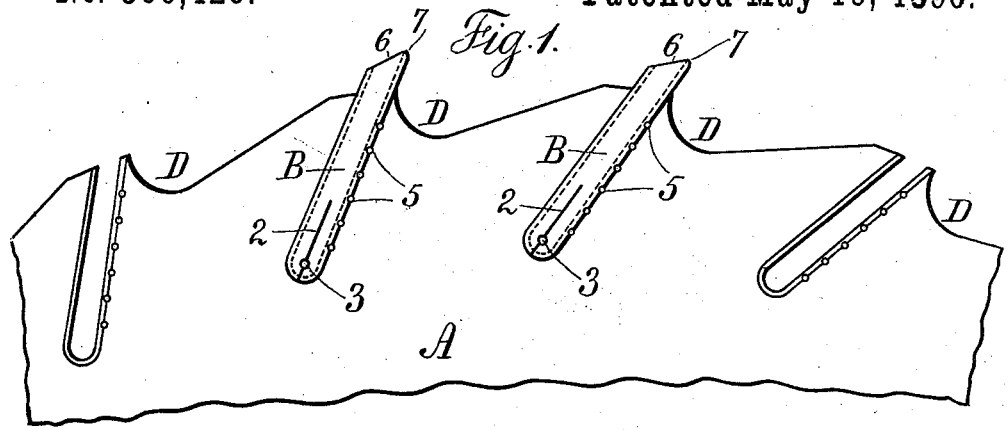
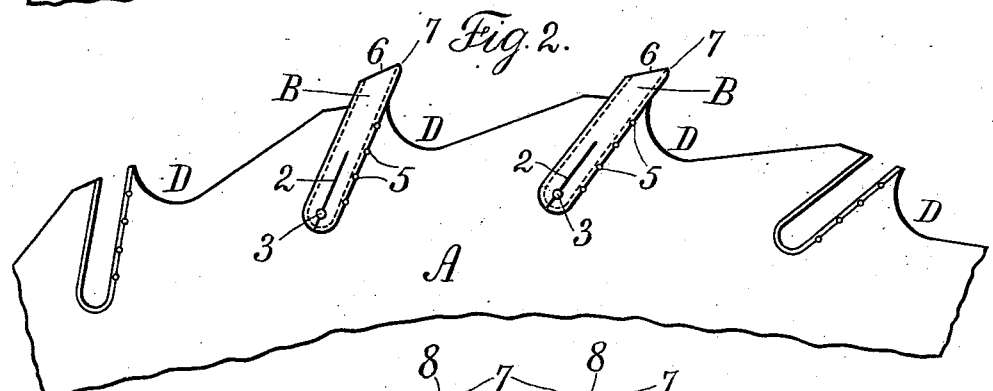
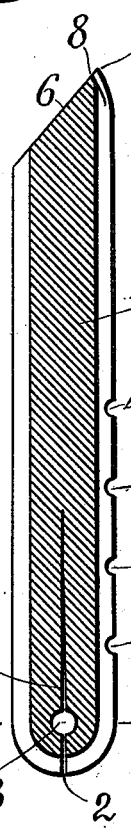
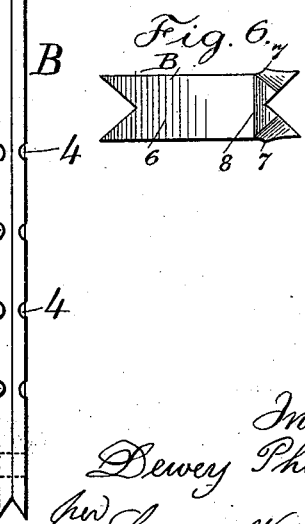
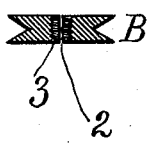
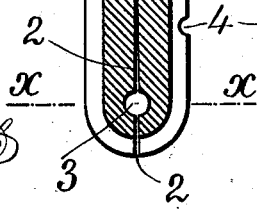
Witnesses:
J. Staib
Chas. H. Smith
Inventor:
Dewey Phillips
by Lemuel W. Serrell
Atty

UNITED STATES PATENT OFFICE.

DEWEY PHILLIPS, OF ARLINGTON, VERMONT.

SAW.

SPECIFICATION forming part of Letters Patent No. 560,426, dated May 19, 1896.

Application filed December 26, 1893. Serial No. 494,646. (No model.)

*To all whom it may concern:*

Be it known that I, DEWEY PHILLIPS, a citizen of the United States, residing at East Arlington, in the county of Bennington and State of Vermont, have invented an Improvement in Saws, of which the following is a specification.

The present improvement is especially adapted to circular saws; and it relates to a peculiarity in the construction of the removable teeth of such saw, whereby the kerf is planed or scored so as to be smooth in its surfaces, whether the sawing is with the grain or across the grain, and the tooth is also constructed with reference to clearing the kerf by the action of a chisel edge.

In the drawings, Figure 1 represents part of a circular saw with openings for my removable teeth when new. Fig. 2 represents part of a similar circular saw with openings adapted to receive my improved teeth when the same are shorter in consequence of wear and sharpening. Fig. 3 is a section in a plane passing through the center of the tooth. Fig. 4 is a cross-section at the line $x\,x$, and Fig. 5 is an elevation of the cutting end of such tooth, and Fig. 6 is an end view of the tooth in larger size.

I find it advantageous to make use of a saw-plate A, notched upon its edge for the reception of the removable teeth, the angle of inclination of the notches to the radius of the circular saw being about thirty degrees, or about sixty degrees to the surface that is cut by the point of the tooth, and with circular saws it is often important to maintain nearly uniformity in the diameter of the path described by the cutting edges of the teeth, and with this object in view I provide two or more circular saws with notches cut in the edges thereof, the notches in the first circular saw being much deeper than those in the second circular saw, whereby the first circular saw is adapted to the reception of teeth of full length, and the second saw having notches that are not as deep is adapted to the reception of the teeth after they have become shortened by filing, grinding, or sharpening, and so on, each saw having notches of less depth than the preceding one. By this means I am enabled to wear the teeth down much shorter than would be safe if such teeth were held in deep slots, because the saw-plate with shallow notches is stiffer and better adapted to support the short teeth than a saw-plate having deep notches in which the teeth might only be held at the extreme outer ends.

The opposite nearly parallel edges of each notch in the saw-plate are V-shaped or beveled, the surfaces standing at about sixty degrees to each other, and the removable teeth B are grooved upon their opposite edges at a corresponding angle. I find it convenient to bevel the opposite edges of the saw-plate at the notches at about an angle of sixty degrees, because an ordinary three-cornered file can be used in the grooved edges of the teeth to cause them to properly fit the notches in the saw-plate should the same be too large to pass properly into such notches, and I split the inner end of each tooth, as shown at 2, and there is a hole at 3, adapted to receive a rivet or wedge pin that is to be driven in after the tooth has been put into its position in the saw-plate, so as to spread the inner end of the tooth and cause the same to bind firmly in the notch of the saw-plate, and by driving out the pin in the hole 3 the pressure and friction are relieved, so that the tooth can be set out from time to time to the desired extent; and I notch the front edge of each tooth, as at 4, and apply a cross pin or rivet 5 through the saw-plate, and when this pin or rivet has been removed the tooth can be set out from one notch to another and the pin replaced for holding the tooth in its projected position with great firmness and reliability.

When a saw-tooth is ground or filed off at the outer end 6 at an inclination, the edges of the tooth will project farther than the metal at the bottom of the V-shaped groove in the edge of the tooth, and in order to form planing or scoring edges upon the tooth the surfaces 7 are rounded and they are sharpened up to form knife or cutting edges, and in so doing the metal is filed back to form a straight or nearly straight chisel edge 8, which serves to clear the kerf of the wood and the cutting edges 7 plane the sides or opposite faces of the kerf, whether cutting with the grain or across the grain, and the chisel edge 8 cuts out or clears the wood that has been scored and separated by the cutting edges 7. Hence it will be apparent that these teeth can be made to leave the surfaces of the wood at the kerf in a smooth condition, and the saw will run much more freely, especially in cross-cutting wood, than in instances where only a chisel edge is employed to tear out the grains or fibers of the wood. It will be understood that the point of the tooth can be spread or swaged to any desired extent, so as to cause the saw to run freely, and, if desired, the cutting edges 7 can be the widest or farthest apart at the extreme outer ends; but, if desired, such cutting edges 7 may be swaged, so as to be slightly the widest at a little distance from the extreme ends of the tooth. Thereby such cutting edges 7 will plane the faces or surfaces of the wood at the kerf immediately after and following the sawing operation, and, by forming a hollow throat D in the edge of the saw-plate adjacent to the cutting surface of the tooth the shavings and sawdust will have ample room to accumululate in the kerf and be discharged by the movement of the saw. A screw may be inserted in the hole 3 to spread the saw-tooth at its inner end in place of a pin.

The saw shown in Fig. 2 has notches that are not as deep as those in Fig. 1. Hence the teeth that have become short by sharpening are taken from the saw with the deep notches, Fig. 1, and used in the shallower notches, Fig. 2, and so on. The teeth may be changed from one saw to another until they are too short to be properly secured in the notches. This feature is available with straight saws as well as with circular saws.

I claim as my invention—

1. A removable tooth for a saw-plate, having a beveled end and grooved edges with cutting edges at the sides of the tooth at or near the outer end, and an intermediate straight cutting or chisel edge between such side cutting edges, substantially as set forth.

2. A removable saw-tooth having a beveled end, a substantially straight cutting edge to clear the wood from the kerf, and side cutting edges to plane the surfaces of the wood at the opposite sides of the kerf, substantially as set forth.

Signed by me this 12th day of December, 1893.

DEWEY PHILLIPS.

Witnesses:
 OTIS WARD,
 WM. SHEPHERD.